C. SMITH.
SLEIGH-RUNNER.

No. 191,481.	Patented May 29, 1877.

UNITED STATES PATENT OFFICE.

CHARLES SMITH, OF NEW HAVEN, CONNECTICUT.

IMPROVEMENT IN SLEIGH-RUNNERS.

Specification forming part of Letters Patent No. 191,481, dated May 29, 1877; application filed February 20, 1877.

*To all whom it may concern:*

Be it known that I, CHAS. SMITH, of New Haven, in the county of New Haven and State of Connecticut, have invented a new Improvement in Sleigh-Runners; and I do hereby declare the following, when taken in connection with the accompanying drawings and the letters of reference marked thereon, to be a full, clear, and exact description of the same, and which said drawings constitute part of this specification, and represent, in—

Figure 1:
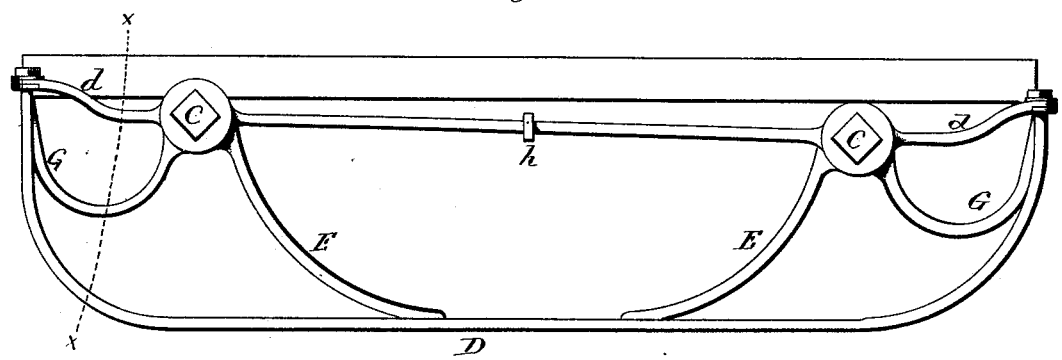
Figure 2:
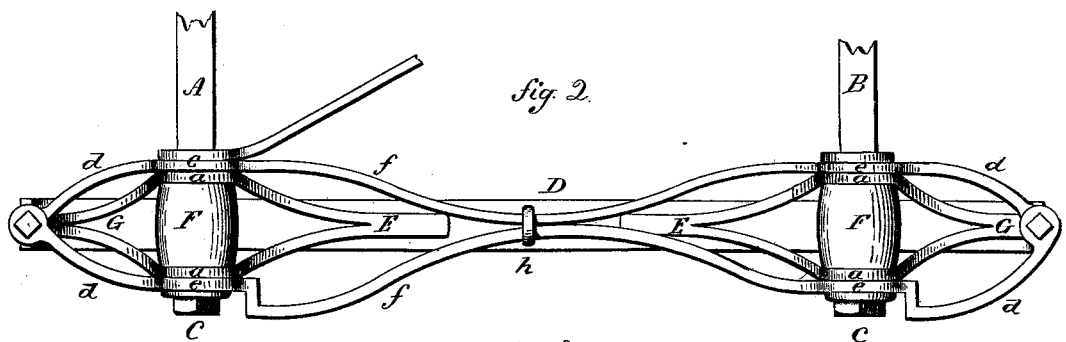

Figure 1, a side view; Fig. 2, a top or plan view; and in Fig. 3, a transverse section on line $x\ x$.

This invention relates to an improvement in that class of runners adapted to be applied to carriages, so as to make the vehicle convertible from wheels to runners, or vice versa; and the invention consists in the peculiar construction of the runner, as hereinafter described and recited in the claim.

Figure 3:
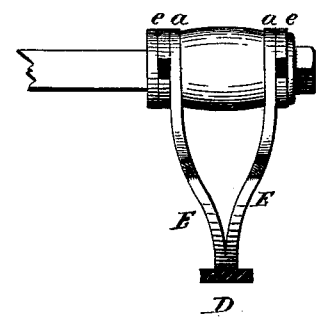

A B represent the two axles of a wheeled vehicle; C C, the nuts which are usually applied for securing the wheels upon the axle. D is the tread of the runner, turned up fore and aft. From this bifurcated supports E extend up and are formed into two collars, $a$, to fit over the arm of the axle and spread, so as to form transverse braces between the axle and the tread, as seen in Figs. 2 and 3. Between the collars $a\ a$ a suitable sleeve, F, is placed on the arm of the axle. In connection with the braces E, similar bifurcated braces G extend and are attached to the collars $a\ a$. From the respective ends of the runner, bars, forming horizontal braces $d$, extend to and are set upon the arms of the axle in the form of collars $e$, with longitudinal connections $f$ from the collars on one arm to the collars on the other, preferably brought together at the center, as at $h$.

It will be understood that the distance between the collars fore and aft corresponds to the distance between the arms of the axles.

Thus constructed, the runners are placed upon the axles, and secured by the nut C. The runners are forged from iron, and are therefore very light, and, owing to the peculiar construction of the supports, are so firmly braced as to possess very great strength, and at the same time a light and graceful appearance.

I do not wish to be understood as broadly claiming a sleigh-runner constructed so as to be attached to both the forward and rear axle-arms of a carriage, as this, I am aware, is very old.

I claim—

The herein-described runner for converting wheeled vehicles to sleighs, consisting of the tread D, with bifurcated vertical supports E and G, connected to collars $a\ a$, corresponding to the arm of each axle, and the longitudinal braces $d\ f$, also connected to the arm of each axle, substantially as specified.

CHARLES SMITH.

Witnesses:
JOHN E. EARLE,
CLARA BROUGHTON.